United States Patent
Zhang et al.

(10) Patent No.: US 12,455,689 B2
(45) Date of Patent: Oct. 28, 2025

(54) TRACKING READ VOLTAGES IN MEMORY DEVICES USING DEEP NEURAL NETWORKS

(71) Applicant: SK hynix Inc., Icheon-si (KR)

(72) Inventors: Fan Zhang, Fremont, CA (US); Meysam Asadi, San Jose, CA (US); Haobo Wang, San Jose, CA (US)

(73) Assignee: SK HYNIX INC., Icheon-si (KR)

( * ) Notice: Subject to any disclaimer, the term of this patent is extended or adjusted under 35 U.S.C. 154(b) by 62 days.

(21) Appl. No.: 18/500,524

(22) Filed: Nov. 2, 2023

(65) Prior Publication Data

US 2025/0147664 A1 May 8, 2025

(51) Int. Cl.
G06F 3/06 (2006.01)
G06N 3/048 (2023.01)

(52) U.S. Cl.
CPC .......... *G06F 3/0611* (2013.01); *G06F 3/0653* (2013.01); *G06F 3/0679* (2013.01); *G06N 3/048* (2023.01)

(58) Field of Classification Search
None
See application file for complete search history.

(56) References Cited

U.S. PATENT DOCUMENTS

| | | | |
|---|---|---|---|
| 10,290,358 B2 | 5/2019 | Alhussien et al. | |
| 10,340,002 B1* | 7/2019 | Kim | G11C 13/0038 |
| 11,342,027 B1* | 5/2022 | Asadi | G11C 29/028 |
| 11,881,262 B2* | 1/2024 | Rummens | G11C 13/004 |
| 2013/0132652 A1* | 5/2013 | Wood | G11C 29/42 711/103 |
| 2017/0358346 A1* | 12/2017 | Zhang | G11C 16/349 |
| 2019/0087719 A1* | 3/2019 | Seo | G11C 11/412 |
| 2019/0172542 A1 | 6/2019 | Miladinovic | |
| 2020/0035291 A1* | 1/2020 | Kasibhatla | G11C 11/4087 |
| 2022/0165337 A1* | 5/2022 | Bhatia | H03M 13/611 |
| 2022/0165338 A1* | 5/2022 | Kim | G11C 16/26 |
| 2023/0024858 A1* | 1/2023 | Pi | G11C 11/1673 |
| 2023/0036490 A1* | 2/2023 | Wang | G11C 11/54 |
| 2023/0176768 A1* | 6/2023 | Asadi | G11C 16/0483 |

OTHER PUBLICATIONS

Anonymous, "Introduction to Deep Learning", Sep. 21, 2023, pp. 1-16, https://web.archive.org/web/20230921163102/ https://www.geeksforgeeks.org/introduction-deep-learning/ (Year: 2023).*

* cited by examiner

*Primary Examiner* — Christopher D Birkhimer
(74) *Attorney, Agent, or Firm* — Perkins Coie LLP

(57) ABSTRACT

Devices, systems, and methods for improving performance of a memory device are described. An example method includes extracting parameters, which include a read threshold set, from each of a first set of host reads, replacing, based on the parameters, at least one host read from a second set of host reads by at least one host read from the first set of host reads, using a deep neural network (DNN) to generate an updated read threshold set, wherein an input to the DNN comprises the parameters from each of the second set of host reads subsequent to the replacing, and applying the updated read threshold set to the memory device to retrieve information from the memory device. In an example, the number of the first set of host reads is at least two orders of magnitude greater than the number of the second set of host reads.

20 Claims, 9 Drawing Sheets

| Page | tRead (us) | | | |
|---|---|---|---|---|
| | Typical | Worst | Typical | Worst |
| Total | 37.09 | 37.58 | 39.37 | 39.85 |
| LSB | 32.38 | 32.8 | 35.77 | 36.2 |
| CSB | 43.31 | 43.89 | 46.6 | 47.16 |
| MSB | 35.59 | 36.05 | 35.76 | 36.19 |

TRACKING READ VOLTAGES IN MEMORY DEVICES USING DEEP NEURAL NETWORKS

TECHNICAL FIELD

This patent document generally relates to non-volatile memory devices, and more specifically, to using deep neural networks in non-volatile memory devices.

BACKGROUND

Solid state memory storage (e.g., 3D NAND flash) with advanced multi-level cell techniques provides high storage density, but suffers from significant performance degradation due to a large number of read-retry operations. Although the read-retry mechanism is essential to ensuring the reliability of modern solid state memory storage, it can significantly increase the read latency. Tracking the read voltage thresholds without additional reads increases the performance of the solid state memory storage.

SUMMARY

Embodiments of the disclosed technology relate to methods, systems, and devices that improve performance of a block of a memory device. In an example, the performance of the memory device is improved by using a deep neural network (DNN) to track the read voltage thresholds with no additional reads. The improved memory device can meet the latency and quality-of-service (QOS) requirements of emerging technologies and applications.

In one example, a method for improving performance of a memory device is described. The method includes extracting one or more parameters, which include a read threshold set, from each of a first plurality of host reads, replacing, based on the one or more parameters, at least one host read from a second plurality of host reads by at least one host read from the first plurality of host reads, and using a DNN to generate an updated read threshold set, wherein an input to the DNN comprises the one or more parameters from each of the second plurality of host reads subsequent to the replacing. In this example, a number of the first plurality of host reads is at least two orders of magnitude greater than a number of the second plurality of host reads. The method concludes with applying the updated read threshold set to the memory device to retrieve information from the memory device.

In another example, the methods may be embodied in the form of an apparatus that includes a processor and a memory coupled to the processor.

In yet another example, the methods may be embodied in the form of processor-executable instructions and stored on a computer-readable program medium.

The subject matter described in this patent document can be implemented in specific ways that provide one or more of the following features.

DETAILED DESCRIPTION

Semiconductor memory devices may be volatile or non-volatile. The volatile semiconductor memory devices perform read and write operations at high speeds, while contents stored therein may be lost at power-off. The nonvolatile semiconductor memory devices may retain contents stored therein even at power-off. The nonvolatile semiconductor memory devices may be used to store contents, which must be retained regardless of whether they are powered.

With an increase in a need for a large-capacity memory device, a multi-level cell (MLC) or multi-bit memory device storing multi-bit data per cell is becoming more common. However, memory cells in an MLC non-volatile memory device must have threshold voltages corresponding to four or more discriminable data states in a limited voltage window. For improvement of data integrity in non-volatile memory devices, the levels, and distributions of read voltages for discriminating the data states must be adjusted over the lifetime of the memory device to have optimal values during read operations and/or read attempts.

FIGS. 1-6 overview a non-volatile memory system (e.g., a flash-based memory, NAND flash) in which embodiments of the disclosed technology may be implemented.

Figure 1:
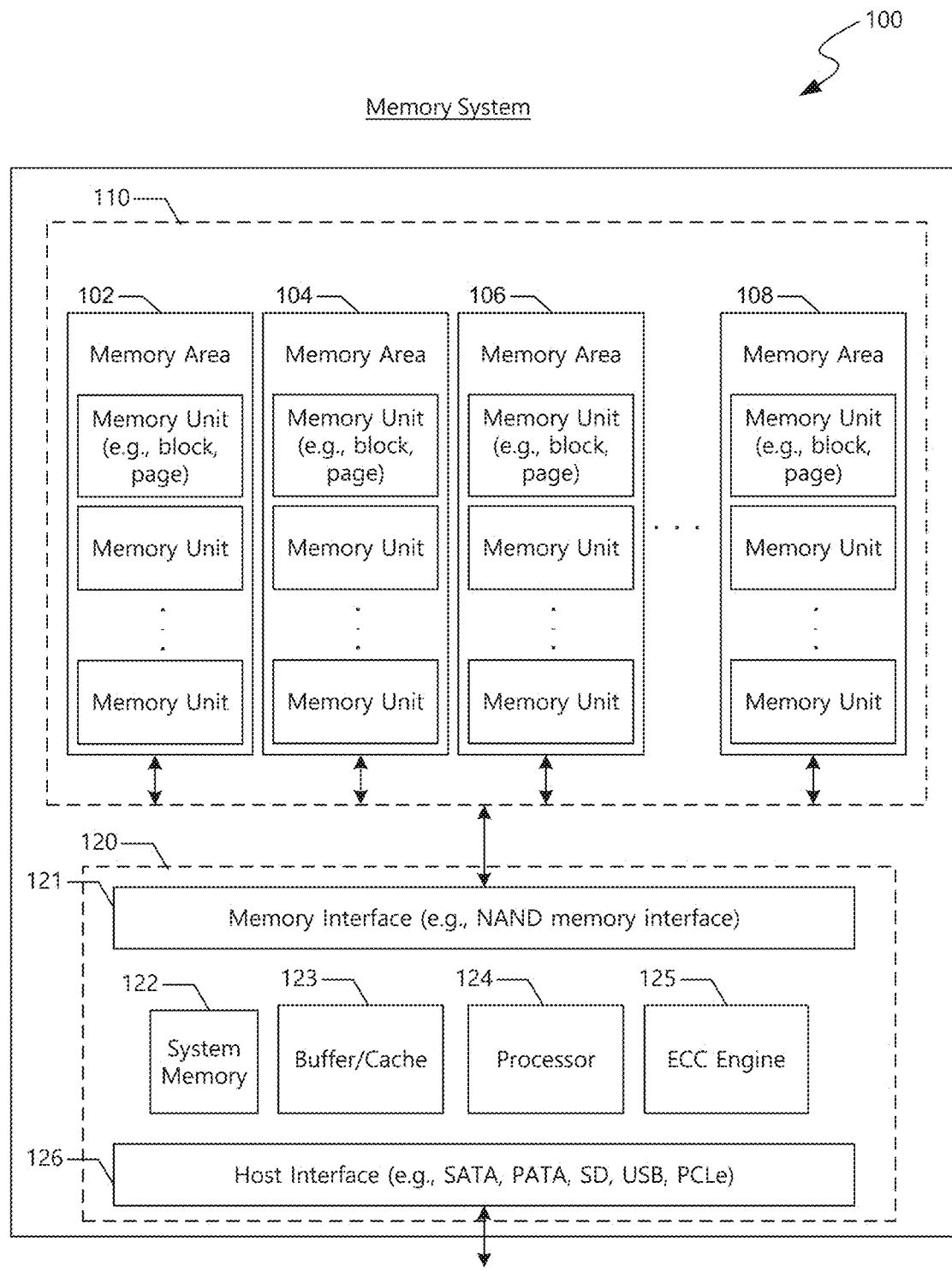
FIG. 1 illustrates an example of a memory system.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively, to temporarily or persistently store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
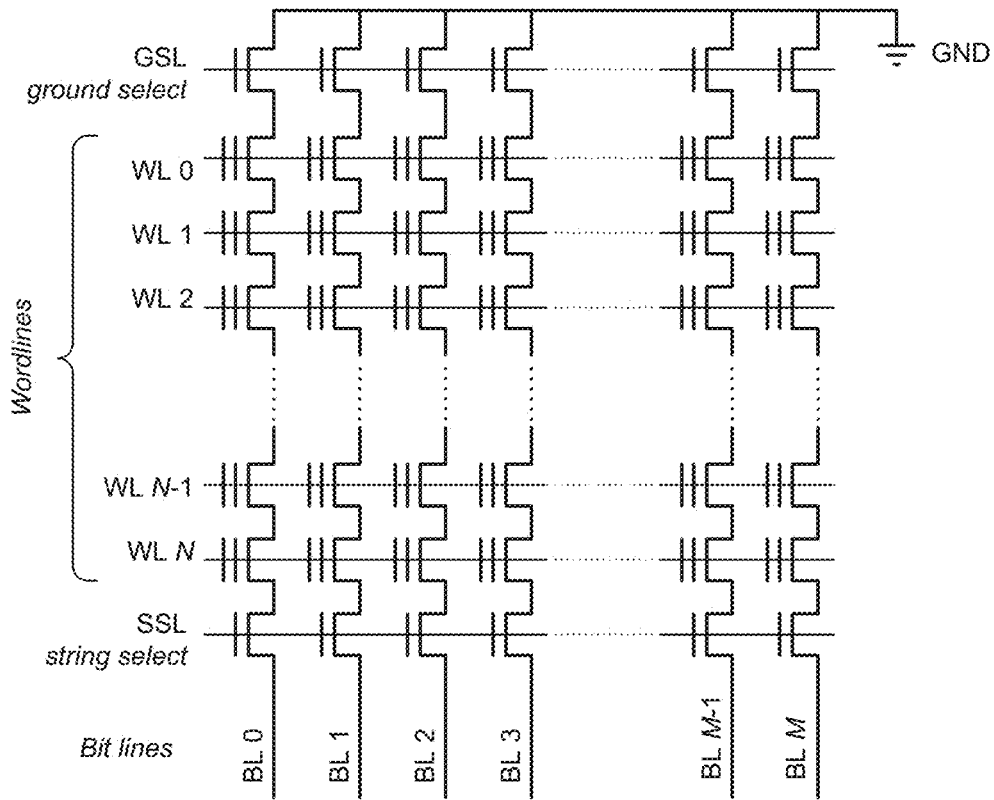
FIG. 2 is an illustration of an example non-volatile memory device.

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
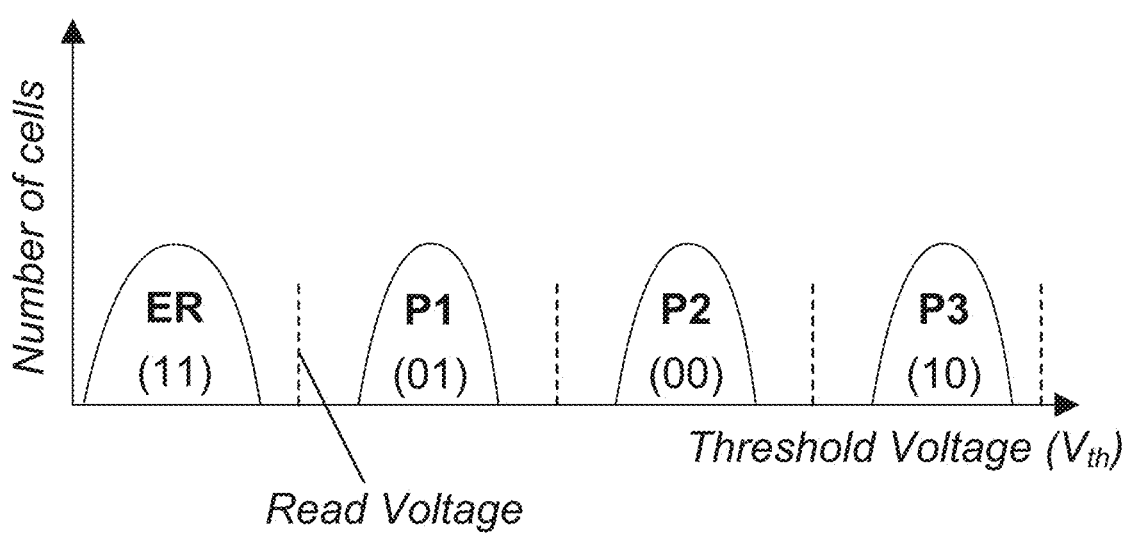
FIG. 3 is an example diagram illustrating the cell voltage level distribution ($V_{th}$) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCO).

Figure 4:
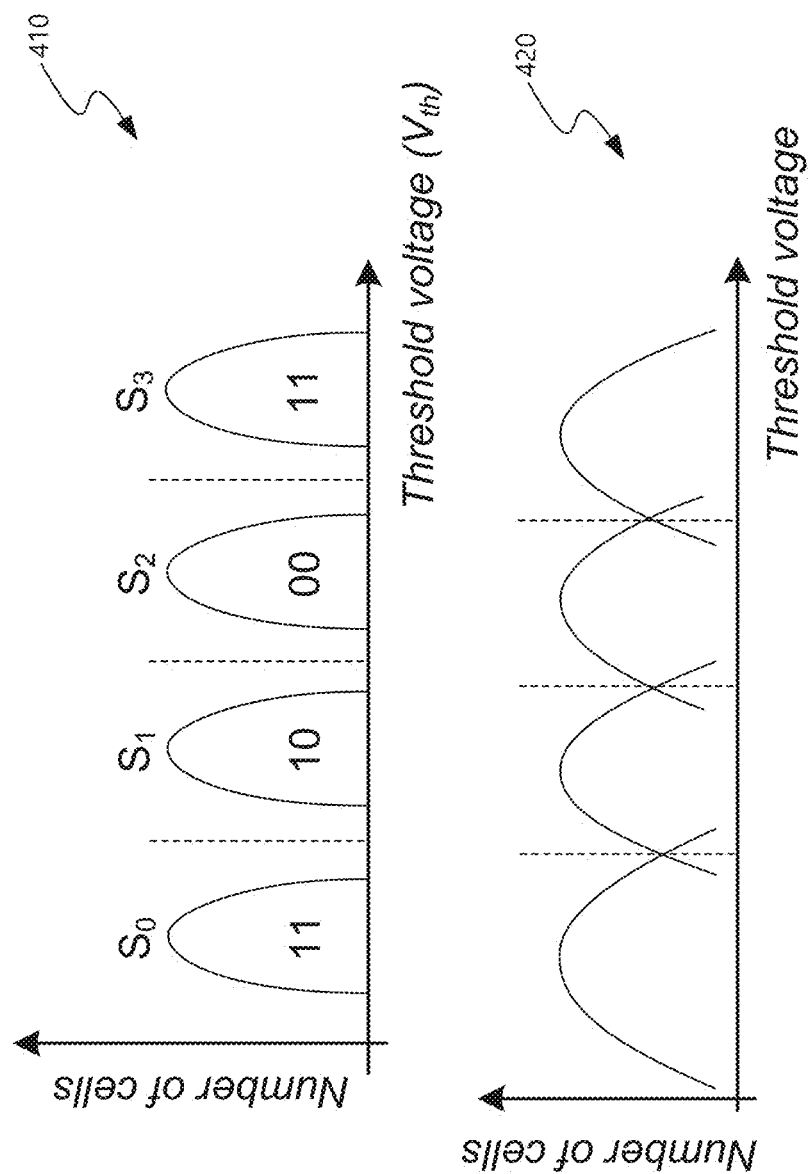
FIG. 4 is another example diagram illustrating the cell voltage level distribution ($V_{th}$) of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2^n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
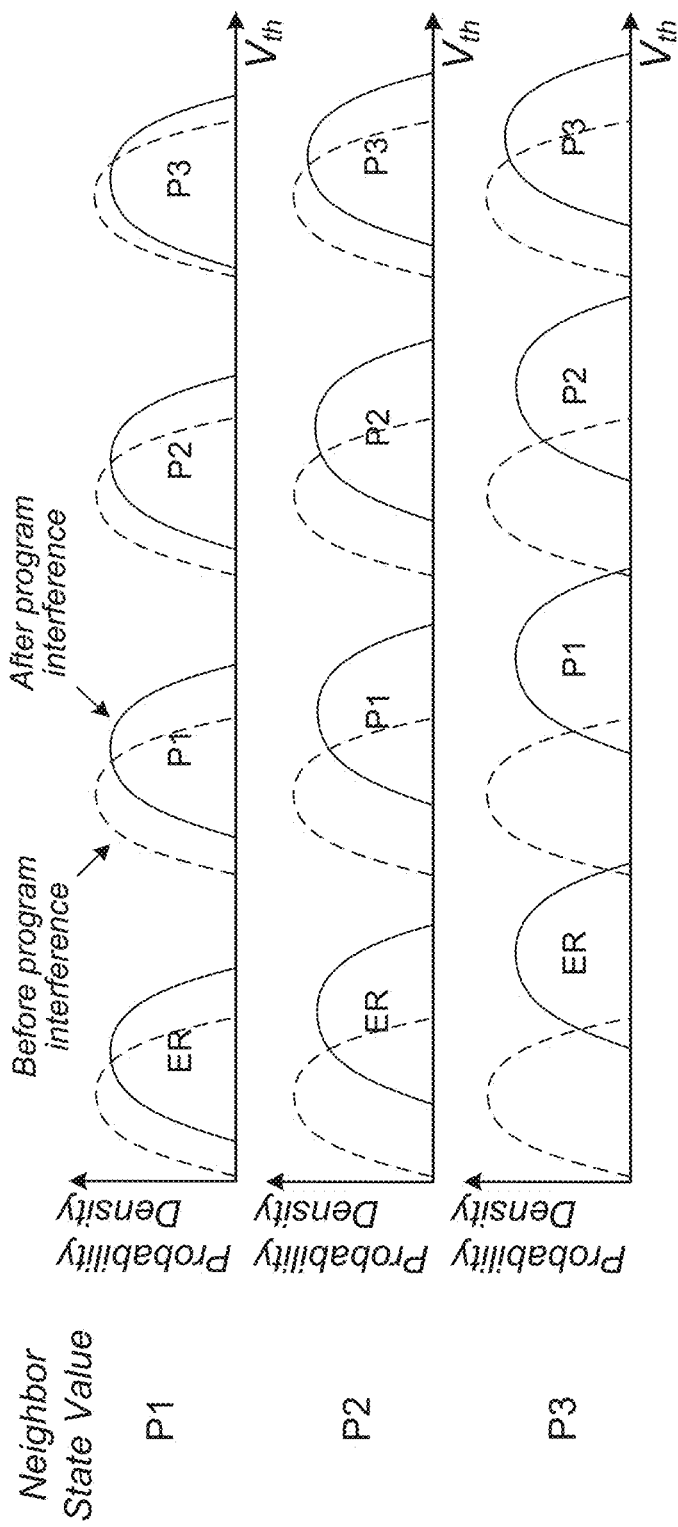
FIG. 5 is an example diagram illustrating the cell voltage level distribution ($V_{th}$) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
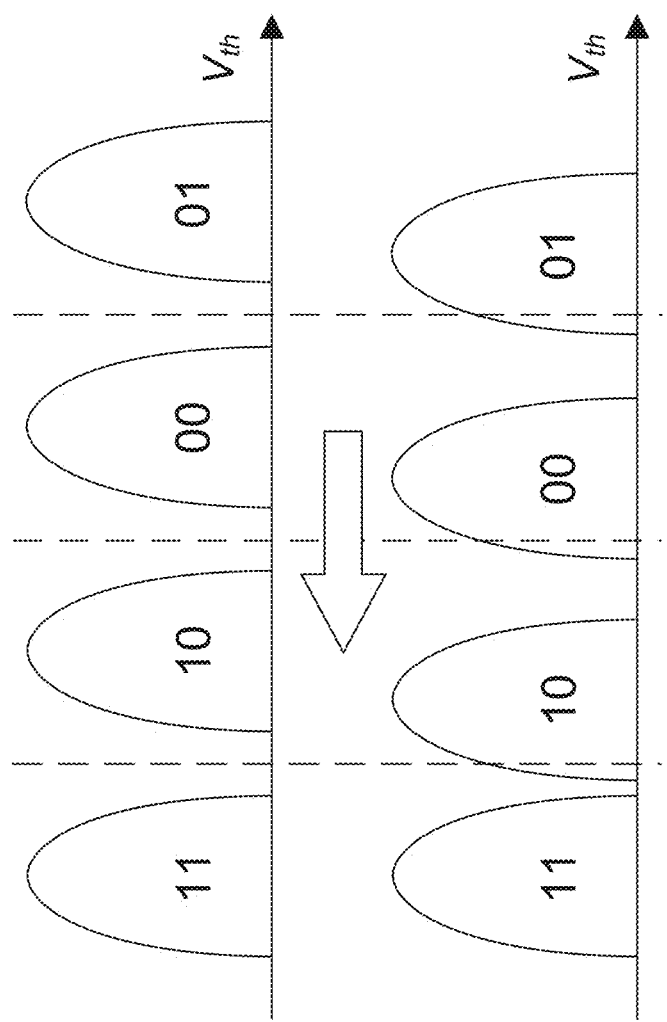
FIG. 6 is an example diagram illustrating the cell voltage level distribution ($V_{th}$) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

NAND-based memory storage systems (e.g., the examples illustrated in FIGS. 1-6) are being used with hosts (e.g., via PCIe), whose bandwidths are doubling every generation. This is resulting in more stringent latency and quality-of-service (QoS) requirements for the memory storage systems. While it is relatively straightforward to provide higher memory storage system performance by increasing, for example, the NAND bandwidth and the system-on-chip (SoC) parallelism, existing methods and techniques fail to meet the ever-tightening QoS requirement.

Embodiments of the disclosed technology provide methods, systems, and devices that track read voltage thresholds using a deep neural network (DNN) engine in the SoC that does not require any additional reads, thereby meeting the more stringent QoS requirements. Furthermore, the prediction accuracy achieved is close to the optimal (or genic) performance.

Figure 7:
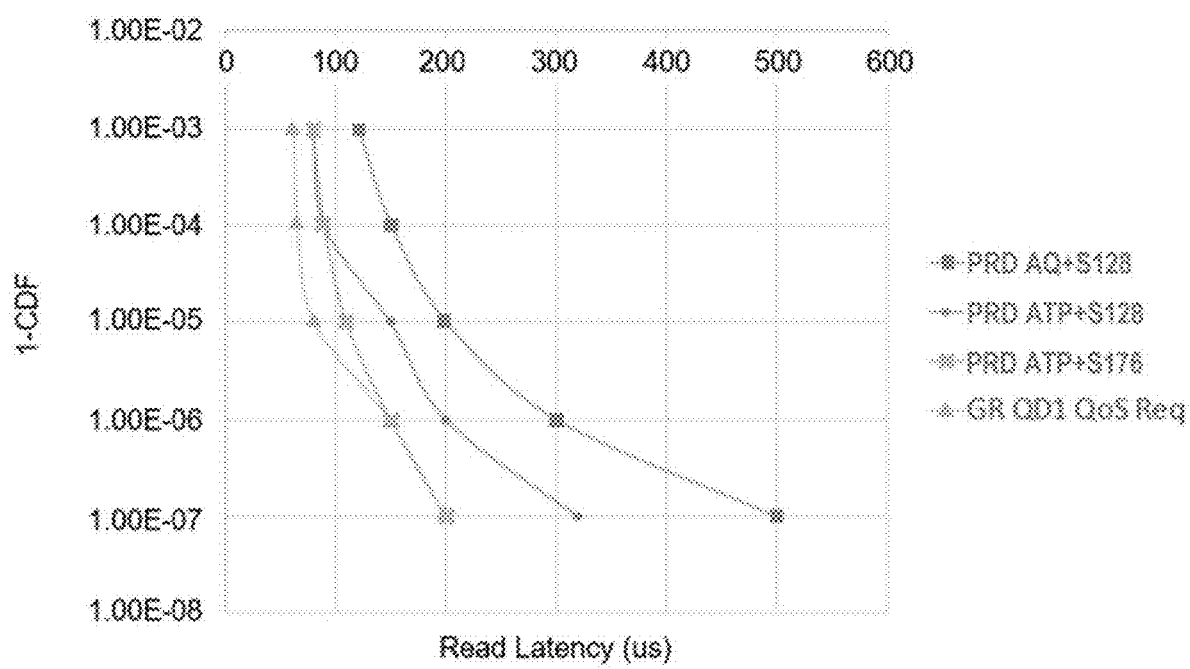
FIG. 7 illustrates the quality-of-service (QoS) requirement of different Peripheral Component Interconnect Express (PCIe) generations.
Figures 8, 9:
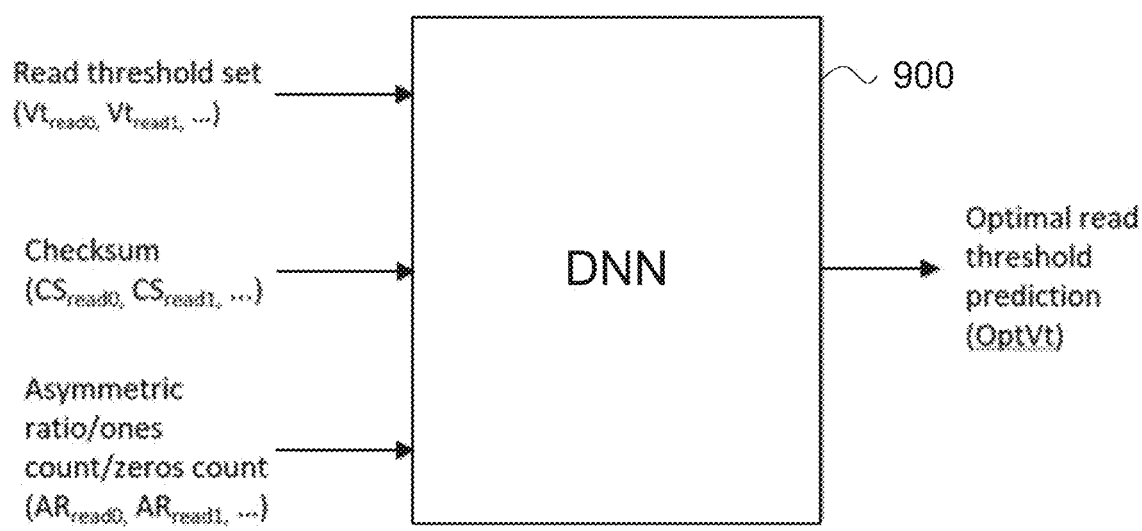
FIG. 8 illustrates an example of read latency for NAND flash memory.
FIG. 9 is an illustration of an example deep neural network (DNN) used in the described embodiments to improve the performance of a memory device.

FIG. 7 illustrates the quality-of-service (QOS) requirement of different Peripheral Component Interconnect Express (PCIe) generations. The QoS requirements shown therein are for the PCIe gen 4 (e.g., AQ), gen 5 (e.g., ATP), and gen 6 (e.g., GR) products. As previously discussed, the QoS scaling from generation to generation has been faster than the scaling of the read latency of NAND flash memory. FIG. 8 illustrates an example of read latency for the newest generation of NAND flash memory. As seen in FIGS. 7 and 8, the first read in a gen 6 product needs to succeed with higher than 99.999% probability, and the first three reads need to succeed with higher than 99.99999% probability. This QoS requirement implies that there is typically no time for a second (or subsequent) read because the read latency involved would violate the QoS requirement.

Existing algorithms and techniques rely on die-history reads, block-history reads, and followed by five HRR reads, etc. to determine the optimal read voltage thresholds to use for successful decoding in the memory storage system. Even current DNN-based or machine learning (ML)-based read voltage threshold estimation methods are unable to meet the QoS requirement because they all require a few failed reads that serve as inputs to the inference engine, which can subsequently predict more accurate read voltage thresholds. Although these methods provide accurate read voltage thresholds, there are unable to do so without violating the stringent QoS requirements (e.g., as described in the context of FIGS. 7 and 8).

The described embodiments use a DNN to track the read voltage thresholds, and do not require any additional reads because the predicting the read voltage thresholds is based only on host reads. Host reads are superior to other reads (e.g., garbage collection reads, background media scan reads, etc.) because NAND flash storage systems are configured to prioritize serving host requirements as fast as possible, and will therefore always be available. Furthermore, millions of reads can be effectively combined to serve as an input to the DNN, which estimates the read voltage thresholds. Relying on this volume of data results in far more accurate estimates, compared to existing schemes that use only a few test reads as input.

The underlying programmed voltage (PV) distribution can change (e.g., as illustrated in FIGS. 4-6) in a variety of circumstances, which include a change in physical location, P/E cycles, retention, read disturb, etc. Any significant occurrence of any of these circumstances will typically result in a change (or shift) of the underlying PV distribution. The firmware is assumed to perform a certain number of reads (e.g., host reads, garbage collection reads, background media scan reads, etc.) in between any change in circumstances. The described embodiments exploit the availability of these reads, and enables the DNN to track the read voltage thresholds without any additional reads. In certain circumstances, e.g., the change in the underlying PV distribution is slight and no intervening reads are available, the described embodiments may benefit from updated read voltage thresholds, in which case additional reads may be performed to capture the slight change in the underlying PV distribution.

In some embodiments, the number of reads from a block (encompassing host reads, GC reads, etc.) can be tracked by an input-collection module, and periodically (e.g., after every 1 million reads), the DNN inference can be performed with selected inputs from the input-collection module in order to update the read voltage thresholds. The updated read voltage thresholds replace the history read entries, and used as the read voltage thresholds for the first read for future reads of this block.

In some embodiments, the input-collection module can be implemented as a firmware feature, which is configured to pick a few (e.g., 5, 10 or 20) of the most informative reads from all the reads performed on the block in that period. For example, the input-collection module can be triggered to collect the reads between the read voltage thresholds update interval, and select the most informative reads at the end of the interval.

In some embodiments, and for every host read (or any other type of read), after decoding, certain meta information is extracted from the decoder, e.g., the initial checksum, the current read voltage threshold distribution, the ones count, the zeros count, etc. This information is sent to the DNN to evaluate its quality. In an example, the top three reads with the highest quality are kept in the input-collection module. If a new read in the current update has better quality than any of the entries in the input-collection module, it replaces the entry with the lowest quality therein.

In some embodiments, the DNN implementation comprises a first component DNN, which is referred to as DNN-QP, and a second component DNN, which is referred to as DNN-Vt. In this architecture, DNN-QP is used to predict the quality of the reads used to identify the candidates for DNN-Vt, which is used to predict the read thresholds. The output of DNN-QP is a quality metric value that is an indication of the desirability of the read as an input to DNN-Vt. In an example, the quality metric value being within a predetermined range is an indication that the corresponding read will be used by DNN-Vt to predict the optimal read thresholds.

FIG. 9 is an illustration of an example deep neural network (DNN) used in the described embodiments to improve the performance of a memory device. As shown therein, the inputs to the DNN 900 include the current read voltage threshold set, the checksums, the ones count, the zeros count, and the asymmetric ratio (which is the ratio of the number of 0→1 bit errors to the number of 1→0 bit errors). In some embodiments, a subset of these parameters may be used as inputs to the DNN 900. In an example, and as described above, the parameters are input to DNN-QP, which selects a subset of the parameters to be used for prediction. The DNN 900 (and in an example, as described above, DNN-Vt) outputs the optimal prediction for the read voltage thresholds, which can be used as the first read for subsequent reads in a block.

In an example, the DNN 900 is a fully connected network with four layers of neurons, with the first three layers of neurons using 256 neurons each, the fourth layer using 128 neurons, and the activation function being a rectified linear activation function (ReLU).

The described embodiments are advantageous over existing schemes that use DNNs, e.g., double backpropagation (DBP), because DBP is a reactive scheme that attempts to estimate the read voltage thresholds for the current time. In contrast, the described embodiments provide proactive schemes that track the read voltage thresholds and periodically update the read voltage thresholds using significantly more data as input, and using, if required, a larger DNN. These features significantly improve prediction accuracy.

Figure 10:
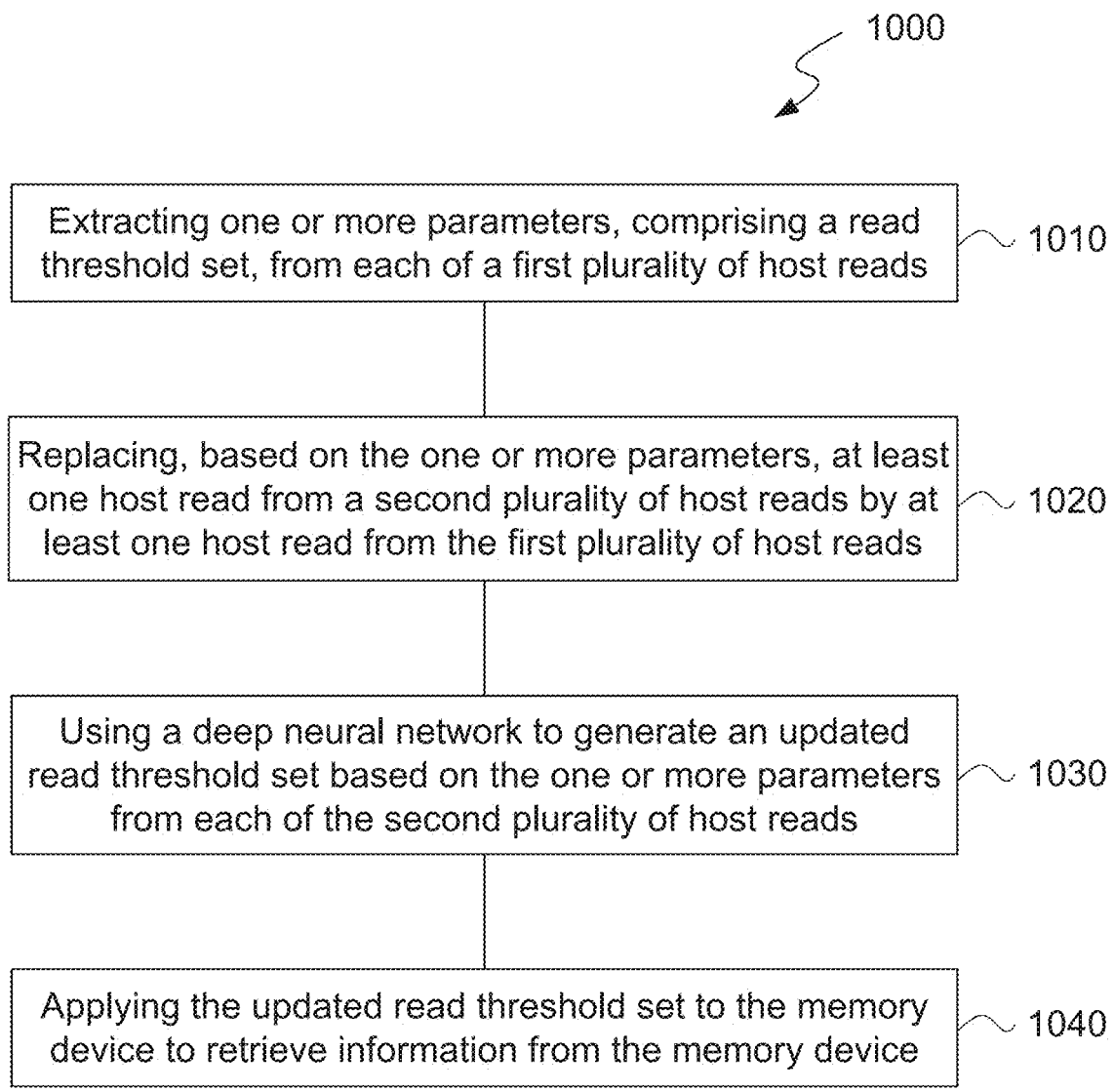
FIG. 10 illustrates a flowchart of an example method for improving the performance of a memory device.

FIG. 10 illustrates a flowchart of an example method 1000 for improving the performance of a memory device. The method 1000 includes, at operation 1010, extracting one or more parameters, comprising a read threshold set, from each of a first plurality of host reads.

The method 1000 includes, at operation 1020, replacing, based on the one or more parameters, at least one host read from a second plurality of host reads by at least one host read from the first plurality of host reads. In an example, a number of the first plurality of host reads is at least two orders of magnitude greater than a number of the second plurality of host reads.

The method 1000 includes, at operation 1030, using a deep neural network (DNN) to generate an updated read threshold set based on the one or more parameters from each of the second plurality of host reads. Herein, an input to the DNN includes the one or more parameters from each of the second plurality of host reads subsequent to the replacing.

The method 1000 includes, at operation 1040, applying the updated read threshold set to the memory device to retrieve information from the memory device.

In some embodiments, the one or more parameters comprises at least one of a checksum, an asymmetric ratio, a ones count, or a zeroes count.

In some embodiments, the replacing the at least one host read comprises determining that a metric associated with the one or more parameters of the at least one host read from the first plurality of host reads is greater than the metric associated with the one or more parameters of the at least one host read from the second plurality of host reads.

In some embodiments, the metric associated with the one or more parameters of the at least one host read from the second plurality of host reads is less than each metric associated with the one or more parameters of other corresponding host reads from the second plurality of host reads.

In some embodiments, a history read threshold set is replaced by the updated read threshold set prior to applying the updated read threshold set.

In some embodiments, the input to the DNN comprises the one or more parameters from a garbage collection (GC) read or a background media scan read.

In some embodiments, the memory device is a non-volatile memory device, and wherein the first plurality of host reads are initiated by a host device that is communicatively coupled to the memory device.

Figure 11:
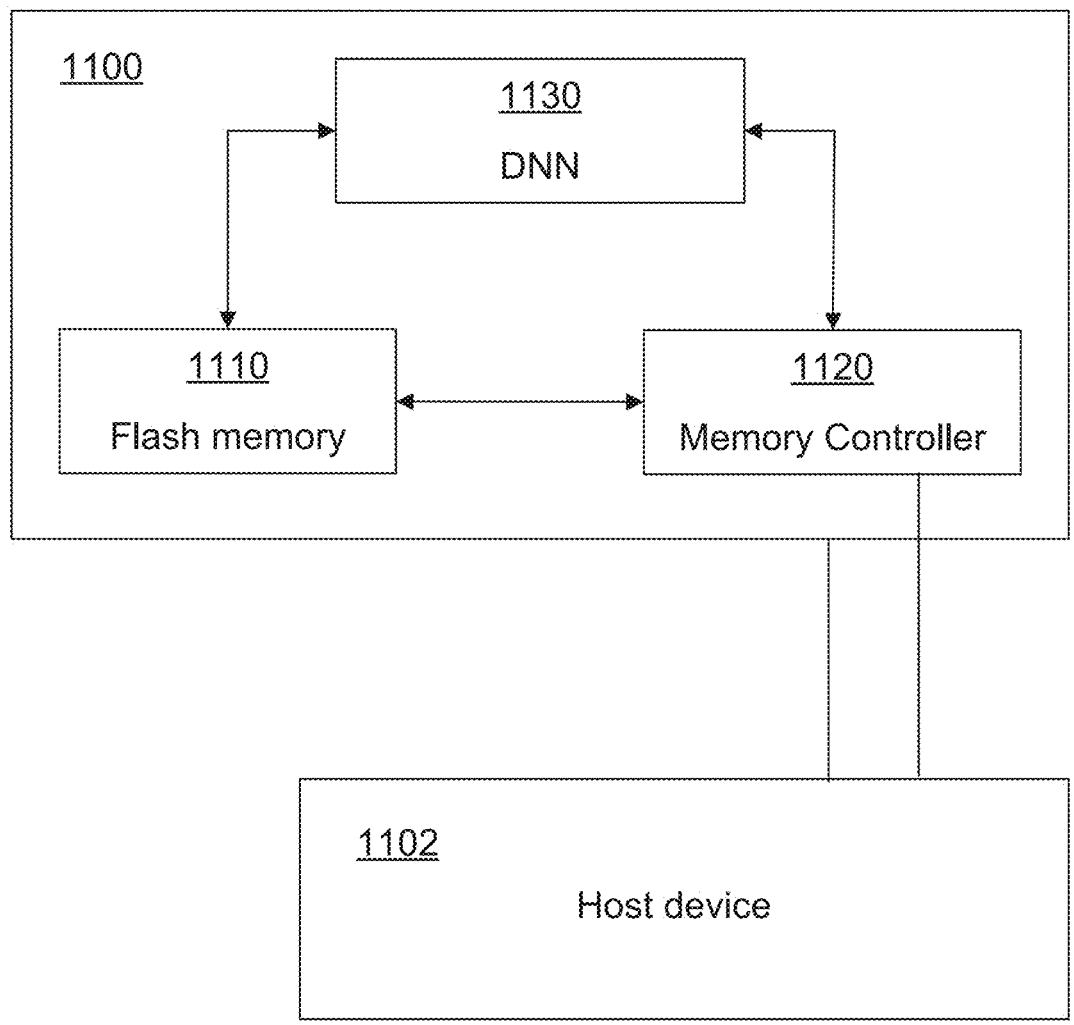
FIG. 11 is an example diagram illustrating a storage device that can be configured to implement the described embodiments.

FIG. 11 is an example diagram illustrating a storage device that can be configured to implement the described embodiments. Referring to FIG. 11, a data storage device 1100 includes a flash memory 1110, a memory controller 1120, and a deep neural network (DNN) 1130, and is communicatively coupled to a host device (or a "host") 1102. The memory controller 1120 may control the flash memory 1110 and the DNN 1130 in response to control signals input from the outside of the data storage device 1100, e.g., from the host 1102. In an example, the host 1102 may require information from the flash memory 1110, and send a host read request (command) to the data storage device 1100, which then uses the memory controller 1120 to access the required data that is stored on the flash memory 1110. In the data storage device 1100, the flash memory 1110 may be configured the same or substantially the same as a nonvolatile memory device. That is, the flash memory 1110 may read data from selected memory cells using different read voltages to output it to the memory controller 1120.

In some embodiments, the DNN 1130 is implemented within the memory controller 1120, e.g., on one or more processors (not shown in FIG. 11) in the memory controller 1120. In an alternative architecture, the one or more processors in the data storage device 1100 are external to the memory controller 1120.

In some embodiments, the data storage device 1100 may be a memory card device, an SSD device, a multimedia card device, an SD card, a memory stick device, an HDD device, a hybrid drive device, or an USB flash device. For example, the data storage device 1100 may be a card which satisfies the standard for user devices such as a digital camera, a personal computer, and so on.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for improving performance of a memory device, comprising:
   extracting a first set of values of one or more parameters from a first plurality of host reads, wherein the one or more parameters comprises a read threshold set;
   replacing, based on the first set of values of the one or more parameters, at least one host read from a second plurality of host reads by at least one host read from the first plurality of host reads, wherein a number of the first plurality of host reads is at least two orders of magnitude greater than a number of the second plurality of host reads;
using a deep neural network (DNN) to generate an updated read threshold set, wherein an input to the DNN comprises a second set of values of the one or more parameters from the second plurality of host reads subsequent to the replacing; and
applying the updated read threshold set to the memory device to retrieve information from the memory device.

2. The method of claim 1, wherein the one or more parameters comprises at least one of a checksum, an asymmetric ratio, a ones count, or a zeroes count.

3. The method of claim 1, wherein the replacing the at least one host read comprises:
determining that a metric associated with values of the one or more parameters of the at least one host read from the first plurality of host reads is greater than the metric associated with values of the one or more parameters of the at least one host read from the second plurality of host reads.

4. The method of claim 3, wherein the metric associated with the values of the one or more parameters of the at least one host read from the second plurality of host reads is less than each metric associated with values of the one or more parameters of other corresponding host reads from the second plurality of host reads.

5. The method of claim 1, wherein a history read threshold set is replaced by the updated read threshold set prior to applying the updated read threshold set.

6. The method of claim 1, wherein the input to the DNN comprises values of the one or more parameters from a garbage collection (GC) read or a background media scan read.

7. The method of claim 1, wherein the memory device is a non-volatile memory device, and wherein the first plurality of host reads are initiated by a host device that is communicatively coupled to the memory device.

8. An apparatus for improving performance of a memory device, comprising:
a memory controller; and
a deep neural network (DNN) communicatively coupled to the memory controller,
wherein the memory controller is configured to:
extract a first set of values of one or more parameters from a first plurality of host reads, wherein the one or more parameters comprises a read threshold set;
replace, based on the first set of values of the one or more parameters, at least one host read from a second plurality of host reads by at least one host read from the first plurality of host reads, wherein a number of the first plurality of host reads is at least two orders of magnitude greater than a number of the second plurality of host reads;
use a deep neural network (DNN) to generate an updated read threshold set, wherein an input to the DNN comprises a second set of values of the one or more parameters from the second plurality of host reads subsequent to the replacing; and
apply the updated read threshold set to the memory device to retrieve information from the memory device.

9. The apparatus of claim 8, wherein the one or more parameters comprises at least one of a checksum, an asymmetric ratio, a ones count, or a zeroes count.

10. The apparatus of claim 8, wherein the memory controller is configured, as part of replacing the at least one host read, to:
determine that a metric associated with values of the one or more parameters of the at least one host read from the first plurality of host reads is greater than the metric associated with values of the one or more parameters of the at least one host read from the second plurality of host reads.

11. The apparatus of claim 10, wherein the metric associated with the values of the one or more parameters of the at least one host read from the second plurality of host reads is less than each metric associated with values of the one or more parameters of other corresponding host reads from the second plurality of host reads.

12. The apparatus of claim 8, wherein a history read threshold set is replaced by the updated read threshold set prior to applying the updated read threshold set.

13. The apparatus of claim 8, wherein the input to the DNN comprises values of the one or more parameters from a garbage collection (GC) read or a background media scan read.

14. The apparatus of claim 8, wherein the memory device is a non-volatile memory device, and wherein the first plurality of host reads are initiated by a host device that is communicatively coupled to the memory device.

15. A non-transitory computer-readable storage medium having instructions stored thereupon for improving performance of a memory device, comprising:
instructions for extracting a first set of values of one or more parameters from a first plurality of host reads, wherein the one or more parameters comprises a read threshold set;
instructions for replacing, based on the first set of values of the one or more parameters, at least one host read from a second plurality of host reads by at least one host read from the first plurality of host reads, wherein a number of the first plurality of host reads is at least two orders of magnitude greater than a number of the second plurality of host reads;
instructions for using a deep neural network (DNN) to generate an updated read threshold set, wherein an input to the DNN comprises a second set of values of the one or more parameters from the second plurality of host reads subsequent to the replacing; and
instructions for applying the updated read threshold set to the memory device to retrieve information from the memory device.

16. The non-transitory computer-readable storage medium of claim 15, wherein the one or more parameters comprises at least one of a checksum, an asymmetric ratio, a ones count, or a zeroes count.

17. The non-transitory computer-readable storage medium of claim 15, wherein the instructions for replacing the at least one host read comprises:
instructions for determining that a metric associated with values of the one or more parameters of the at least one host read from the first plurality of host reads is greater than the metric associated with values of the one or more parameters of the at least one host read from the second plurality of host reads, wherein the metric associated with the values of the one or more parameters of the at least one host read from the second plurality of host reads is less than each metric associated with values of the one or more parameters of other corresponding host reads from the second plurality of host reads.

18. The non-transitory computer-readable storage medium of claim 15, wherein a history read threshold set is replaced by the updated read threshold set prior to applying the updated read threshold set.

19. The non-transitory computer-readable storage medium of claim 15, wherein the input to the DNN comprises values of the one or more parameters from a garbage collection (GC) read or a background media scan read.

20. The non-transitory computer-readable storage medium of claim 15, wherein the memory device is a non-volatile memory device, and wherein the first plurality of host reads are initiated by a host device that is communicatively coupled to the memory device.

* * * * *